US007952398B2

(12) United States Patent
Salcido et al.

(10) Patent No.: US 7,952,398 B2
(45) Date of Patent: May 31, 2011

(54) BIAS CIRCUIT FOR COMMON-MODE AND SEMICONDUCTOR PROCESS VOLTAGE AND TEMPERATURE OPTIMIZATION FOR A RECEIVER ASSEMBLY

(75) Inventors: Manuel Salcido, Fort Collins, CO (US); J. Ken Patterson, Fort Collins, CO (US); Thomas Edward Cynkar, Fort Collins, CO (US)

(73) Assignee: Avago Technologies Enterprise IP (Singapore) Pte. Ltd., Singapore (SG)

( * ) Notice: Subject to any disclaimer, the term of this patent is extended or adjusted under 35 U.S.C. 154(b) by 1068 days.

(21) Appl. No.: 11/741,115

(22) Filed: Apr. 27, 2007

(65) Prior Publication Data

US 2008/0268804 A1    Oct. 30, 2008

(51) Int. Cl.
*H03B 1/00* (2006.01)
(52) U.S. Cl. ........................................ 327/109; 327/534
(58) Field of Classification Search .................. 327/108, 327/109, 534, 535, 537, 538
See application file for complete search history.

(56) References Cited

U.S. PATENT DOCUMENTS

| 6,525,609 B1* | 2/2003 | Behzad | 330/254 |
| 6,600,346 B1* | 7/2003 | Macaluso | 327/108 |
| 7,362,146 B2* | 4/2008 | Macaluso | 327/108 |

\* cited by examiner

*Primary Examiner* — Jeffrey S Zweizig (57) ABSTRACT

A receiver suitable for applications that desire a common-mode voltage range from approximately 0.7V to approximately 0.9V is arranged by coupling first and second differential pair circuit architectures based on first and second current-steering schemes into the same path to generate an output signal. The receiver includes first and second differential pair circuits. The first differential pair circuit is coupled to a first current-steering path via a first port and a second current-steering path via a second port. The second differential pair circuit is coupled to the first current-steering path via a third port and the second current-steering path via a fourth port. A bridge circuit is interposed between the first and second differential pair circuits. The bridge circuit integrates the first and second current-steering paths in a single-stage of the receiver assembly. A bias signal directs the bridge circuit over a set of worst case conditions.

20 Claims, 9 Drawing Sheets

BIAS CIRCUIT FOR COMMON-MODE AND SEMICONDUCTOR PROCESS VOLTAGE AND TEMPERATURE OPTIMIZATION FOR A RECEIVER ASSEMBLY

BACKGROUND

The use of small geometry and low-voltage semiconductor devices (i.e., semiconductor devices that reliably operate when the voltage across any two transistor terminals is less than a relatively low maximum voltage) is the trend in advanced integrated circuits (ICs). These low-voltage devices consume less power and can be reliably operated at higher clock rates than larger geometry semiconductor devices that tolerate relatively higher terminal-to-terminal voltage differences. Accordingly, low-voltage devices are used in a number of electronic systems. Intermediate voltage-level devices (i.e., devices that reliably operate when the voltage across any two transistor terminals is less than approximately 3V) are generally used in ICs that require analog functions. Even higher voltage levels are required by some circuits used in both analog and digital functional blocks related to system interfaces and other functions. One way to accommodate these higher voltages is to use transistors designed to operate reliably at corresponding higher voltage levels. For example, transistors where the voltage across any two transistor device terminals can be 5V without reliability issues (i.e., 5V transistors) can be used to manage inter-IC power (e.g., on/off) functions over a range of voltages from 0V to about 5V.

As input/output power supply voltages are reduced, it becomes increasingly difficult to meet performance requirements for high-speed low-voltage applications using complimentary metal-oxide semiconductor (CMOS) devices using a field-effect transistor (FET) designed to tolerate higher terminal-to-terminal voltages. One reason for the increased difficulty is that known operational amplifier designs with conventional bias circuits tend to stray from their optimal performance at different process, voltage and temperature (PVT) combinations.

Therefore, it would be desirable to provide a low cost, reliable and integrated receiver solution that can not only be implemented using existing semiconductor manufacturing process technologies but can optimally perform across a range of PVT conditions.

SUMMARY

One embodiment of a circuit for controlling a receiver assembly comprises three semiconductor device networks. A first semiconductor device network has a first intermediate node. A second semiconductor device network has a second intermediate node and is connected to the first intermediate node of the first semiconductor device network. A third semiconductor device network is connected to the second semiconductor device network at the second intermediate node. The second intermediate node is further coupled to a bridge circuit in the receiver assembly. The bridge circuit includes first and second current-steering paths.

One embodiment of a method for controlling a receiver that uses a dual current-steering architecture includes the steps of coupling a control input to each of a first and a second current-steering path in a receiver, providing a first network of semiconductor devices forming a first intermediate node, providing a second network of semiconductor devices forming a second intermediate node, providing a third network of semiconductor devices, coupling the second network of semiconductor devices to the first network of semiconductor devices at the first intermediate node, coupling the third network of semiconductor devices to the second network of semiconductor devices at the second intermediate node, applying a reference voltage to the first and third networks of semiconductor devices and coupling the second intermediate node to the control input.

An alternative embodiment of a method for controlling a receiver comprises the steps of using a bridge circuit to couple a first and a second current-steering path in a receiver and applying a control input to the bridge circuit that directs operation of the receiver over a range of varying circuit conditions.

The figures and detailed description that follow are not exhaustive. The disclosed embodiments are illustrated and described to enable one of ordinary skill to make and use the high-speed receiver over a complete range of PVT combinations. Other embodiments, features and advantages of the high-speed receiver assembly and method for controlling the same will be or will become apparent to those skilled in the art upon examination of the following figures and detailed description. All such additional embodiments, features and advantages are within the scope of the assemblies, circuits and methods as defined in the accompanying claims.

BRIEF DESCRIPTION OF THE FIGURES

The high-speed receiver assembly and methods for controlling the same can be better understood with reference to the following figures. The components within the figures are not necessarily to scale, emphasis instead being placed upon clearly illustrating the principles of the high-speed receiver. Moreover, in the figures, like reference numerals designate corresponding parts throughout the different views.

DETAILED DESCRIPTION

The high-speed receiver assembly or high-speed receiver can be implemented in a myriad of systems and applications where it is desirable to provide accurate and reliable high-speed input buffers (i.e., receivers) using higher-voltage FETs operating at lower-voltages. In one embodiment, the high-speed receiver uses 3.3V FETs to operate at approximately 1.5V.

The high-speed receiver can include any or a combination of the following technologies, which are all well known in the art: discrete electronic components, an integrated circuit, an application-specific integrated circuit having appropriately configured semiconductor devices and other circuit elements (e.g., discrete resistors or semiconductor devices arranged to simulate a resistor). The high-speed receiver is accurate and reliable over a range of voltages.

In some embodiments, the high-speed receiver is implemented with a combination of low-voltage semiconductor devices and higher voltage semiconductor devices.

In one embodiment, the high-speed receiver is suitable for applications that desire a common-mode voltage from approximately 0.7V to approximately 0.9V. The high-speed receiver is arranged by coupling first and second differential pair circuit architectures based on first and second current-steering schemes into the same path to generate an output signal. The high-speed receiver includes first and second differential pair circuits. The first differential pair circuit is coupled to a first current-steering path via a first port and a second current-steering path via a second port. The second differential pair circuit is coupled to the first current-steering path via a third port and the second current-steering path via a fourth port. A bridge circuit is interposed between the first and second differential pair circuits. The bridge circuit integrates the first and second current-steering paths in a single-stage of the high-speed receiver assembly.

The bridge circuit is controlled by a bias circuit that uses the single-ended receiver trip-level reference voltage to track the common-mode voltage and different PVT effects to bias the bridge circuit at the optimum voltage across a broad range of PVT combinations. The bias circuit in combination with the architecture of the high-speed receiver enables a high-speed receiver that operates at approximately 1.5V using FETs optimized for operation at a higher-voltage level. The combination of the bias circuit and the architecture of the high-speed receiver enable operation of the receiver across a set of simulated corner or worst case conditions for PVT variations.

Figure 1:
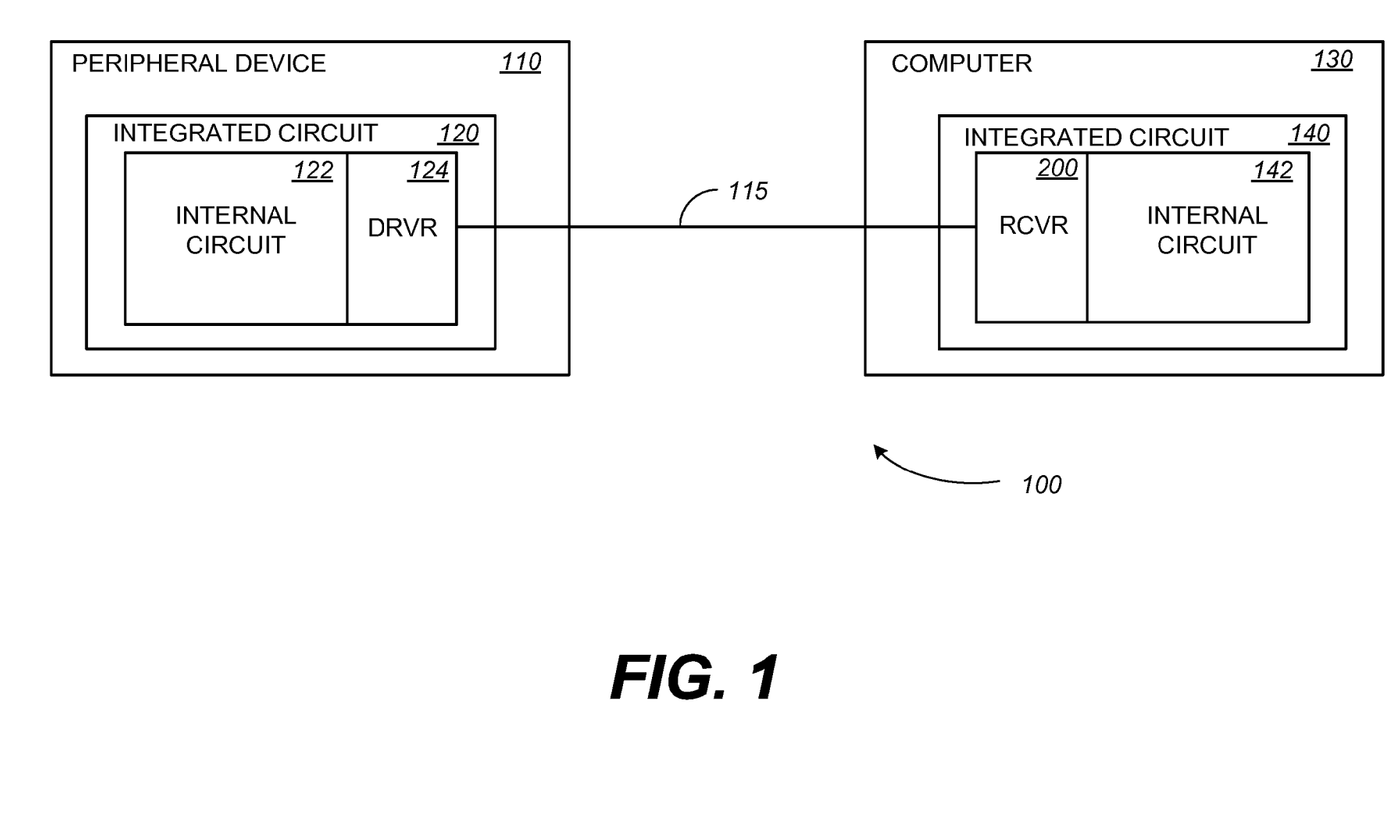
FIG. 1 is a block diagram of an embodiment of a pair of communicatively coupled systems.

Turning now to the drawings, wherein like reference numerals designate corresponding parts throughout the drawings, reference is made to FIG. 1, which illustrates a block diagram of an embodiment of a pair of communicatively coupled devices. System 100 includes a peripheral device 110 connected to a computer 130 via a connection 115. Both peripheral device 110 and computer 130 contain respective integrated circuits. Integrated circuit 120 within peripheral device 110 is coupled to integrated circuit 140 within computer 130 via internal circuit 122, signal driver 124, wired connection 115, high-speed receiver assembly, labeled "RCVR" 200 and internal circuit 142. For simplicity of illustration and description, system 100 depicts a transfer of information via a data signal that propagates from its origin within internal circuit 122 to its destination in internal circuit 142. To traverse the gap bridged by connection 115, the data signal is controllably conditioned and transmitted by driver 124. High-speed receiver assembly 200 receives the transmitted data and controllably conditions the received data before forwarding the signal to internal circuit 142.

In the illustrated embodiment, system 100 includes dissimilar devices (i.e., peripheral device 110 and computer 130). System 100 is not limited to this combination and may include similarly configured devices. For example, various circuits or functional blocks within very large scale integrated circuits will often be coupled to each other to communicate one or more control or data signals. When these signals traverse a relatively large gap between a sending circuit block and a receiving circuit block, these input/output circuits will often use an output buffer or driver to transmit the intended signal and an input buffer or receiver to collect and reproduce the received signal.

Although connection 115 is illustrated in FIG. 1 as a single link connecting peripheral device 110 to computer 130, and more particularly internal circuit 122 with internal circuit 142 via driver 124 and receiver 200, it will be appreciated that connection 115 can be a multiple conductor connection such as those configured to support operation of a data transfer mechanism such as a serial data bus or a parallel data bus.

Figure 2:
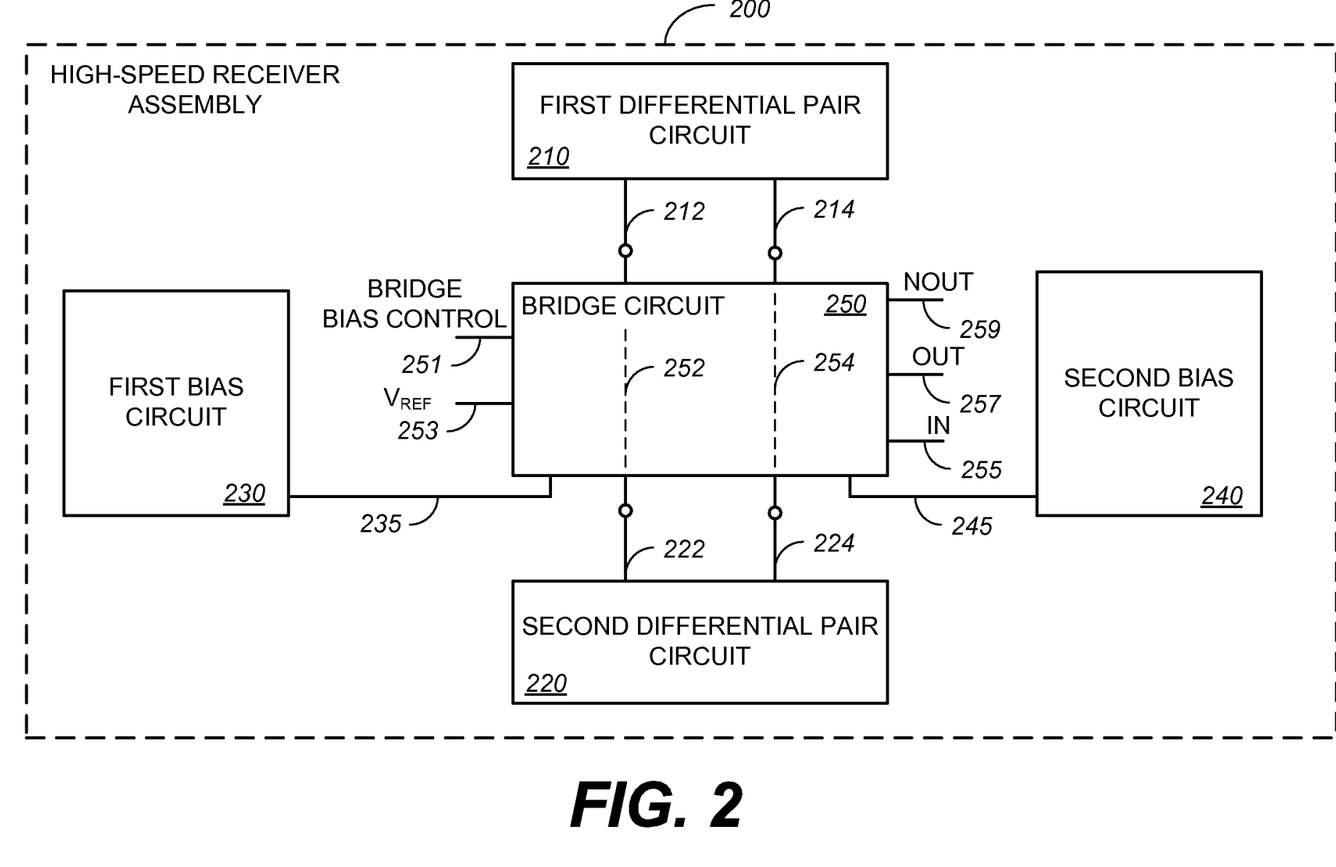
FIG. 2 is a functional block diagram illustrating an embodiment of the high-speed receiver assembly of FIG. 1.

FIG. 2 is a functional block diagram illustrating an embodiment of the high-speed receiver assembly 200 of FIG. 1. As illustrated in FIG. 2, high-speed receiver assembly 200 includes first differential pair circuit 210 and second differential pair circuit 220 with bridge circuit 250 interposed between first differential pair circuit 210 and second differential pair circuit 220. First differential pair circuit 210 forms first port 212, which is connected to first current-steering path 252 through bridge circuit 250 and port 214, which is connected to second current-steering path 254 through bridge circuit 250. Second differential pair circuit 220 forms third port 222, which is connected to first current-steering path at an opposing end of first port 252. Second differential pair circuit 220 also forms fourth port 224, which is connected to second current-steering path 254 at an opposing end of second port 214.

In addition to the first and second bias signals, bridge circuit 250 further receives a bridge bias control via connection 251, a reference voltage, Vref, via connection 253, and an input signal via connection 255. Although, the illustrated embodiment depicts the reference voltage and input signal as being supplied to bridge circuit 250 via single connections, it should be understood that connection 253 and connection 255 are differential input signals. As also illustrated in FIG. 2, bridge circuit 250 receives a first bias signal from first bias circuit 230 via connection 235 and a second bias signal from second bias circuit 240 via connection 245. As will be explained further below, the bridge circuit combines the first and second current-steering paths of the high-speed receiver assembly under the control of the first bias signal, the second bias signal and the bridge bias control signal to generate first and second differential output signals, labeled "OUT" and "NOUT," along connection 257 and connection 259, respectively. The first and second differential output signals closely track the input signal across a range of temperatures and circuit conditions introduced by semiconductor device manufacturing process variation.

Figure 3:
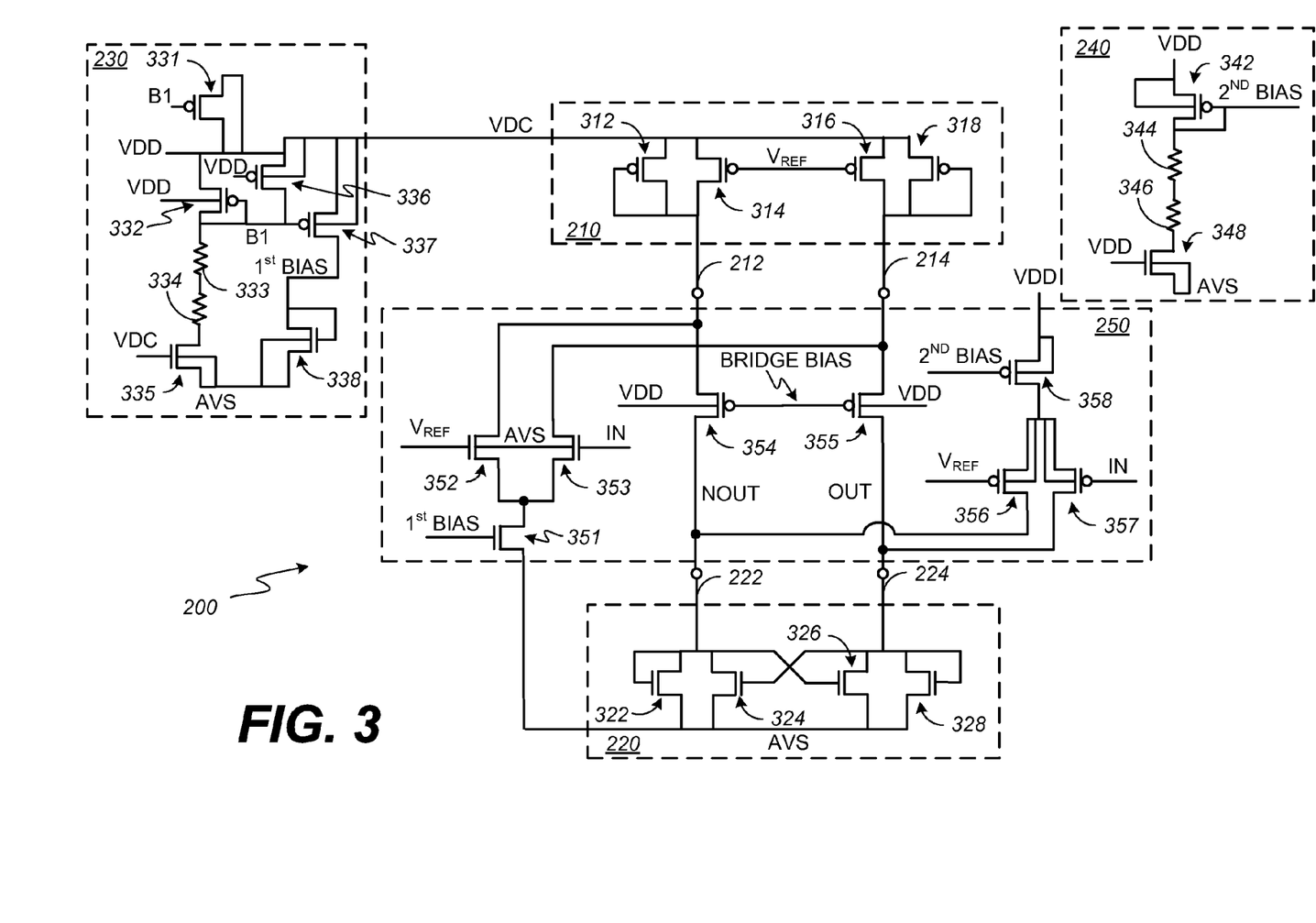
FIG. 3 is a schematic diagram illustrating an alternative embodiment of the high-speed receiver assembly of FIG. 1.

FIG. 3 is a circuit schematic illustrating an alternative embodiment of the high-speed receiver 200 of FIG. 1. As illustrated in FIG. 3, high-speed receiver assembly 200 includes first differential pair circuit 210 and second differential pair circuit 220 with bridge circuit 250 interposed between first differential pair circuit 210 and second differential pair circuit 220. First differential pair circuit 210 receives an input voltage, labeled VDC, from first bias circuit 230, a second input voltage, labeled Vref and as described above forms first port 212 and second port 214. First differential pair circuit 210 includes a first set of semiconductor devices. In the illustrated embodiment, the first set of semiconductor devices includes a network of PFETs. The network of PFETs is arranged as follows. Each of the source terminals of PFET 312, PFET 314, PFET 316 and PFET 318 are coupled to input VDC. The drain terminals of PFET 312 and PFET 314 are coupled to each other and to the gate terminal of PFET 312. The drain terminals of PFET 312 and PFET 314 and the gate terminal of PFET 312 are coupled to port 212. The gate terminals of PFET 314 and PFET 316 are coupled to each other and receive the second input voltage (Vref). The drain terminals of PFET 316 and PFET 318 are coupled to each other and to the gate terminal of PFET 318. The drain terminals of PFET 316 and PFET 318 and the gate terminal of PFET 318 are coupled to port 214.

Second differential pair circuit 220 receives an input voltage, labeled AVS, from first bias circuit 230 and as described above forms third port 222 and fourth port 224. Second differential pair circuit 220 includes a second set of semiconductor devices. In the illustrated embodiment, the second set of semiconductor devices includes a network of NFETs. The network of NFETs is arranged as follows. Each of the drain terminals of NFET 322, NFET 324, NFET 326 and NFET 328 are coupled to each other and to input AVS. The source terminals of NFET 322 and NFET 324 as well as the gate terminals of NFET 326 and NFET 322 are coupled to each other and third port 222. The source terminals of NFET 326 and NFET 328 as well as the gate terminals of NFET 324 and NFET 328 are coupled to each other and fourth port 224.

First bias circuit 230 receives an input voltage, labeled VDD. In response to the VDD input, first bias circuit 230 generates three outputs. A first output, labeled VDC, is applied at an input of the first differential pair circuit 210 as described above. A second output, labeled AVS, is coupled to the second differential pair circuit 220 as also described above. A third output, labeled $1^{st}$ BIAS, will be applied to an input of bridge circuit 250 to controllably couple the first differential pair circuit 210 to the first and second current-steering paths of bridge circuit 250. In the illustrated embodiment, first bias circuit includes a network of semiconductor devices and a pair of resistive elements coupled in series. The network of semiconductor devices includes both PFETs and NFETs.

First bias circuit 230 is arranged as follows. Input voltage, VDD, is coupled to the source terminals of PFET 331, PFET 332, PFET 336 and PFET 337. Input voltage, VDD, is also coupled to the drain of PFET 331 and to the gate of PFET 336. The gate terminals of PFET 331, PFET 332 and PFET 337 are coupled to each other along with the drain terminals of PFET 332 and PFET 336. The node formed by the gate terminals of PFET 331, PFET 332 and PFET 337 and the drain terminals of PFET 332 and PFET 336 is labeled B1. The series combination of resistive element 333 and resistive element 334 is interposed between node B1 and the source of NFET 335. The gate of NFET 335 receives voltage VDC, which as described above is also coupled to first differential pair circuit 210. The drain of PFET 337 and the source of NFET 338 form a node, labeled $1^{st}$ BIAS. As described above, the voltage at $1^{st}$ BIAS is provided at a corresponding input to bridge circuit 250. Second output, AVS, is coupled to the drain terminals of NFET 335 and NFET 338.

Second bias circuit 240 receives an input voltage, labeled VDD. In response to the VDD input, second bias circuit 240 generates two outputs. A first output, labeled AVS, is coupled to the second differential pair circuit 220 and first bias circuit 230 as described above. A second output, labeled $2^{nd}$ BIAS, will be applied to an input of bridge circuit 250 to controllably couple the second differential pair circuit 220 to the first and second current-steering paths of bridge circuit 250. In the illustrated embodiment, second bias circuit includes a network of semiconductor devices and a pair of resistive elements coupled in series. The network of semiconductor devices includes both a PFET and a NFET.

Second bias circuit 240 is arranged as follows. Input voltage, VDD, is coupled to the source terminal of PFET 342 and the gate terminal of NFET 348. The gate terminal and drain terminal of PFET 342 are coupled to each other forming a node, labeled $2^{nd}$ BIAS, which as described above is applied to bridge circuit 250. A series combination of resistive element 344 and resistive element 346 is interposed between node $2^{nd}$ BIAS and the source of NFET 348. As described above, first output, AVS, is coupled to the drain terminal of NFET 348.

Bridge circuit 250 is interposed between first differential pair circuit 210 and second differential pair circuit 220. Specifically, bridge circuit 250 is coupled to first differential pair circuit 210 via first port 212 and second port 214. Bridge circuit 250 is coupled to second differential pair circuit 220 via third port 222 and fourth port 224. Circuit elements interposed between first port 212 and third port 222 form a first current-steering path through bridge circuit 250. Similarly, circuit elements interposed between second port 214 and fourth port 224 form a second current-steering path through bridge circuit 250. In contrast with known analog receiver designs, bridge circuit 250 combines the multiple ports without the application of additional receiver stages.

As described above, bridge circuit 250 receives the first and second bias signals ($1^{st}$ BIAS and $2^{nd}$ BIAS) from first bias circuit 230 and second bias circuit 240, respectively. As further described above, bridge circuit 250 receives a bridge bias control voltage. Bridge circuit 250 also receives Vref and an input signal at multiple locations. As shown in FIG. 3, bridge circuit 250 is also arranged to receive VDD and AVS input voltages at multiple locations.

Bridge circuit 250 includes a network of semiconductor devices. The network of semiconductor devices includes PFETs and NFETs. A first current-steering path includes PFET 354. The source terminal of PFET 354 is coupled to first port 212. The gate of PFET 354 is coupled to the bridge bias control input node. The drain terminal of PFET 354 is coupled to third port 222. A second current-steering path includes PFET 355. The source terminal of PFET 355 is coupled to second port 214. The gate of PFET 355 is coupled to the bridge bias control input node and the gate of PFET 354. The drain terminal of PFET 355 is coupled to fourth port 224.

A first current-steering control couples the $1^{st}$ BIAS, Vref and IN voltages to first port 212 and second port 214. This first current-steering control includes NFET 351, NFET 352 and NFET 353. The source terminals of NFET 352 and NFET 353 are coupled to first port 212 and second port 214, respectively. Input Vref is coupled to the gate terminal of NFET 352. Input voltage IN is coupled to the gate terminal of NFET 353. The drain terminals of NFET 352 and NFET 353 are coupled to each other and the source terminal of NFET 351. $1^{st}$ BIAS input is coupled to the gate of NFET 351. The drain of NFET 351 is coupled to input AVS.

A second current-steering control couples the $2^{nd}$ BIAS, Vref and IN voltages to third port 222 and fourth port 224. This second current-steering control includes PFET 356, PFET 357 and PFET 358. The drain terminals of PFET 356 and PFET 357 are coupled to third port 222 and fourth port 224, respectively. Input Vref is coupled to the gate terminal of PFET 356. Input voltage IN is coupled to the gate terminal of PFET 357. The source terminals of PFET 356 and PFET 357 are coupled to each other and the drain terminal of PFET 358. The $2^{nd}$ BIAS input is coupled to the gate of PFET 358. The source of PFET 358 is coupled to input VDD.

The high-speed receiver assembly 200 is arranged by combining low-voltage optimized PFETs and NFETs with higher-voltage optimized PFETs and NFETs. FETs exposed to external circuits are of the latter type (i.e., FETs optimized for operation at higher-voltages). All remaining FETs or those FETs that are not exposed to external circuits are core FETs or FETs optimized for operation at low-voltage. As indicated above, in one embodiment, the higher voltage FETs are optimized for operation at approximately 3.3V and the low-voltage FETs are optimized for operation at approximately 1.5V.

In operation, bridge circuit 250 controllably combines the first and second current-steering paths of the high-speed receiver assembly under the control of the first bias signal, the second bias signal and the bridge bias control signal to generate first and second differential output signals, labeled "OUT" and "NOUT." The first and second differential output signals closely track the input signal across a range of temperatures and circuit conditions introduced by semiconductor device manufacturing process variation. This is accomplished by applying a bridge bias control signal that directs the application of the first and second steering paths over a range of conditions that result from semiconductor device manufacturing process variation and changes in temperature. The range of conditions includes a subset of worst case or corner conditions responsive to variations in supply voltages and characteristics of capacitive and resistive elements formed on the integrated circuit.

Figure 4:
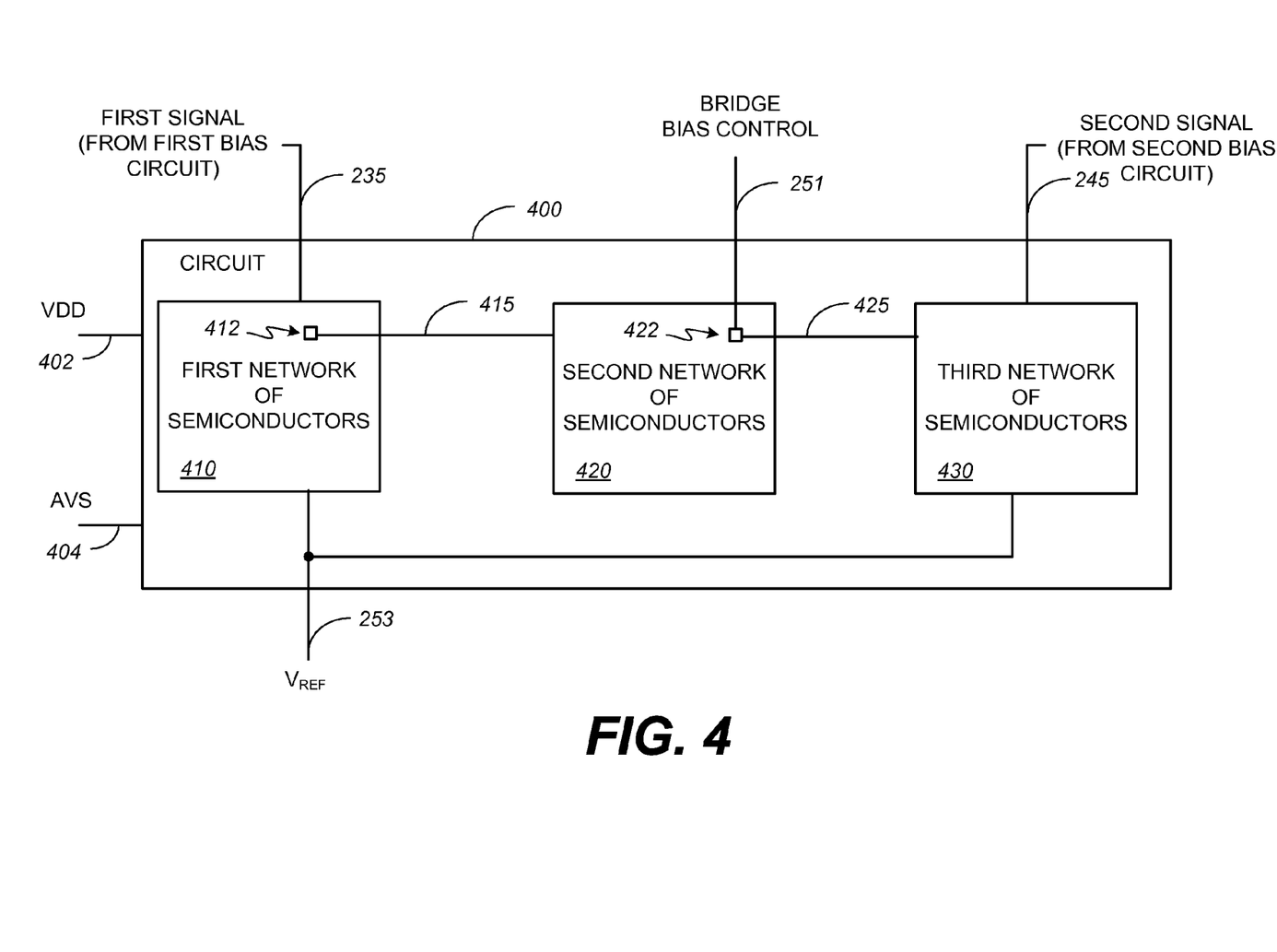
FIG. 4 is a functional block diagram illustrating an embodiment of a circuit that generates the bridge bias control of FIG. 2.

FIG. 4 is a functional block diagram illustrating an embodiment of a circuit 400 that generates the bridge bias control of FIG. 2. As illustrated in FIG. 4, circuit 400 receives five input voltages and in response generates the above-described bridge bias control. More specifically, circuit 400 receives supply voltages VDD and AVS along connection 402 and connection 404, respectively. Circuit 400 receives reference voltage Vref along connection 253, which is distributed within circuit 400 to first network of semiconductors 410 and third network of semiconductors 430. In addition to these voltages, circuit 400 also receives the first signal from first bias circuit 230 (FIG. 2), which is coupled to first network of semiconductors 410 via connection 235 and the second signal from second bias circuit 240 (FIG. 2), which is coupled to third network of semiconductors 430.

As further illustrated in FIG. 4, first network of semiconductors 410 includes a first intermediate node 412 that is coupled to second network of semiconductors 420 via connection 415. The second network of semiconductors 420 includes a second intermediate node 422 that is coupled to third network of semiconductors 430 via connection 425 and to the bridge bias control input of receiver 200 via connection 251.

Figure 5:
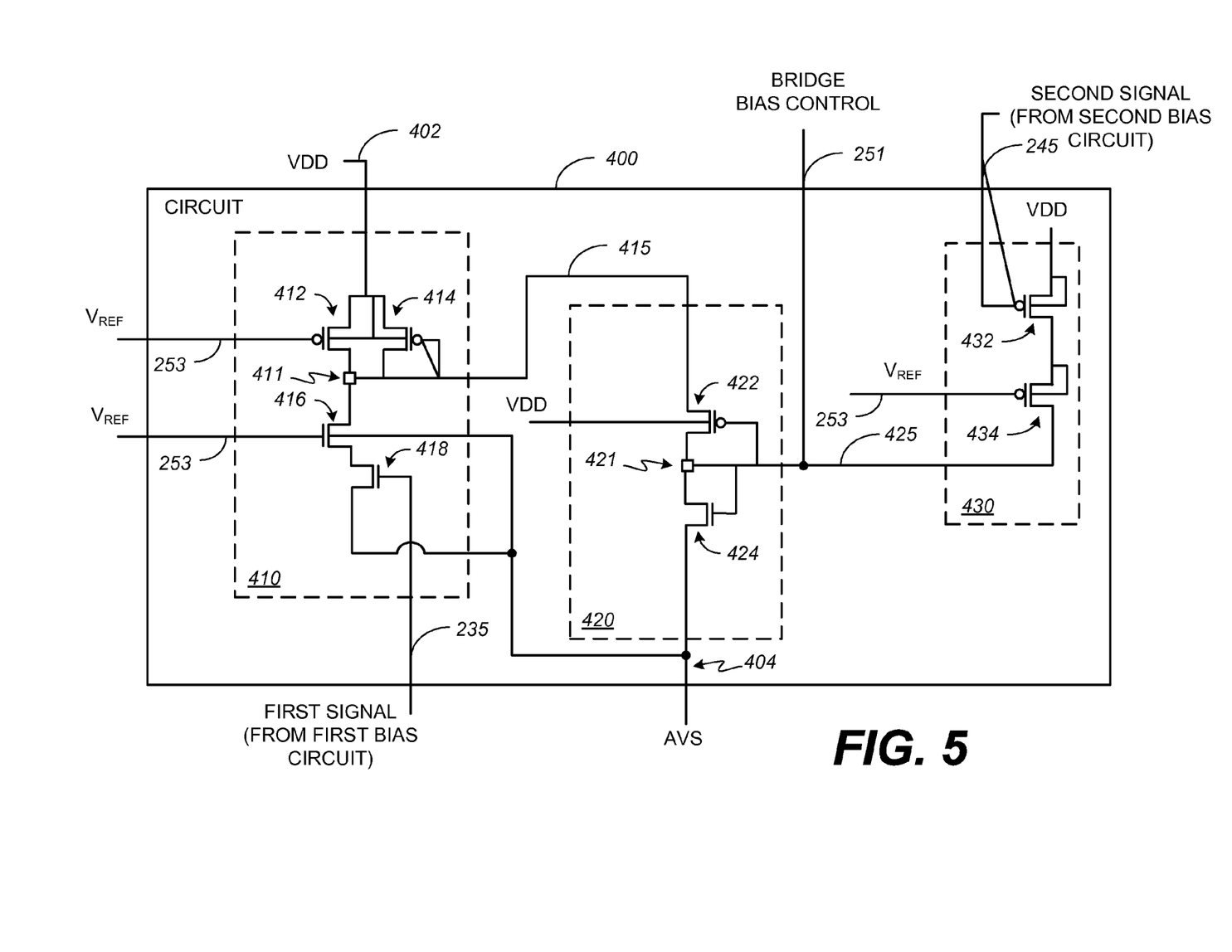
FIG. 5 is a schematic diagram illustrating an alternative embodiment of the circuit of FIG. 4.

FIG. 5 is a schematic diagram illustrating an alternative embodiment of the circuit 400 of FIG. 4. As illustrated in FIG. 5, first network of semiconductors 410 includes PFET 412, PFET 414, NFET 416 and NFET 418. The source terminals of PFET 412 and PFET 414 are coupled to input voltage VDD via connection 402. The gate terminals of PFET 412 and NFET 416 are coupled to input voltage Vref via connection 253. First intermediate node 411 is formed by the intersection of the drain terminals of PFET 412 and PFET 414 as well as the gate terminal of PFET 414 and the source terminal of NFET 416. The drain terminal of NFET 416 is coupled to the source terminal of NFET 418. The gate terminal of NFET 418 receives the first signal from the first bias circuit (FIG. 2) via connection 235. The drain terminal of NFET 418 receives input voltage AVS via connection 404. As further illustrated in FIG. 5, first intermediate node 411 is coupled to the second network of semiconductors 420 via connection 415.

Second network of semiconductors 420 includes PFET 422 and NFET 424. The source of PFET 422 receives the voltage on the first intermediate node 411 via connection 415. Second network of semiconductors 420 receives input voltages VDD and AVS via connection 402 and connection 404, respectively. Second intermediate node 421 is formed by the intersection of the gate and drain terminals of PFET 422 as well as the source and gate terminals of NFET 424. The drain terminal of NFET 424 receives input voltage AVS via connection 404. As further illustrated in FIG. 5, second intermediate node 421 is coupled to the third network of semiconductors 430 via connection 425 and bridge circuit 250 (FIG. 2) via connection 253.

Third network of semiconductors 430 includes PFET 432 and PFET 434. The source of PFET 432 receives input voltage VDD via connection 402. The gate terminal of PFET 432 receives the second signal from the second bias circuit (FIG. 2) via connection 245. The drain terminal of PFET 432 is coupled to the source terminal of PFET 434. The gate terminal of PFET 434 receives input voltage Vref via connection 253. The drain terminal of PFET 434 is coupled to second intermediate node 421 via connection 425.

The combination of circuit 400 with the receiver assembly 200 uses an operational amplifier differential pair architecture. A target application for the combination includes a common-mode range of approximately 0.7V to 0.9V.

Accordingly, the receiver assembly 200 uses two differential pair architectures using both PFET and NFET based current-steering schemes. As illustrated in FIGS. 2 and 3, the PFET and NFET based current-steering schemes steer into a first current-steering path and a second current-steering path. Conventional designs have kept each current-steering scheme separate from the other. In contrast, the present architecture couples the first and second current-steering paths rather than generating a final output signal in a subsequent stage.

PFET 354 and PFET 355, which serve as the cascaded FETs from the perspective of the NFETs in the second differential pair circuit 220 (FIG. 2) are biased with circuit 400. Circuit 400 self biases at a voltage level for a broad range of PVT combinations. The self-biasing voltage level can be described as the metastability point of a first combination formed by PFET 354, NFET 322 and NFET 324 and of a second combination formed by PFET 355, NFET 326 and NFET 328.

It can be shown that the circuit 400 in combination with the receiver assembly 200 can meet each PVT case for receiver performance for a single-ended transition at 1V/ns and 4V/ns transitions at the low and high ranges of the desired common-mode voltages for a high-speed transistor logic receiver.

Figure 6:
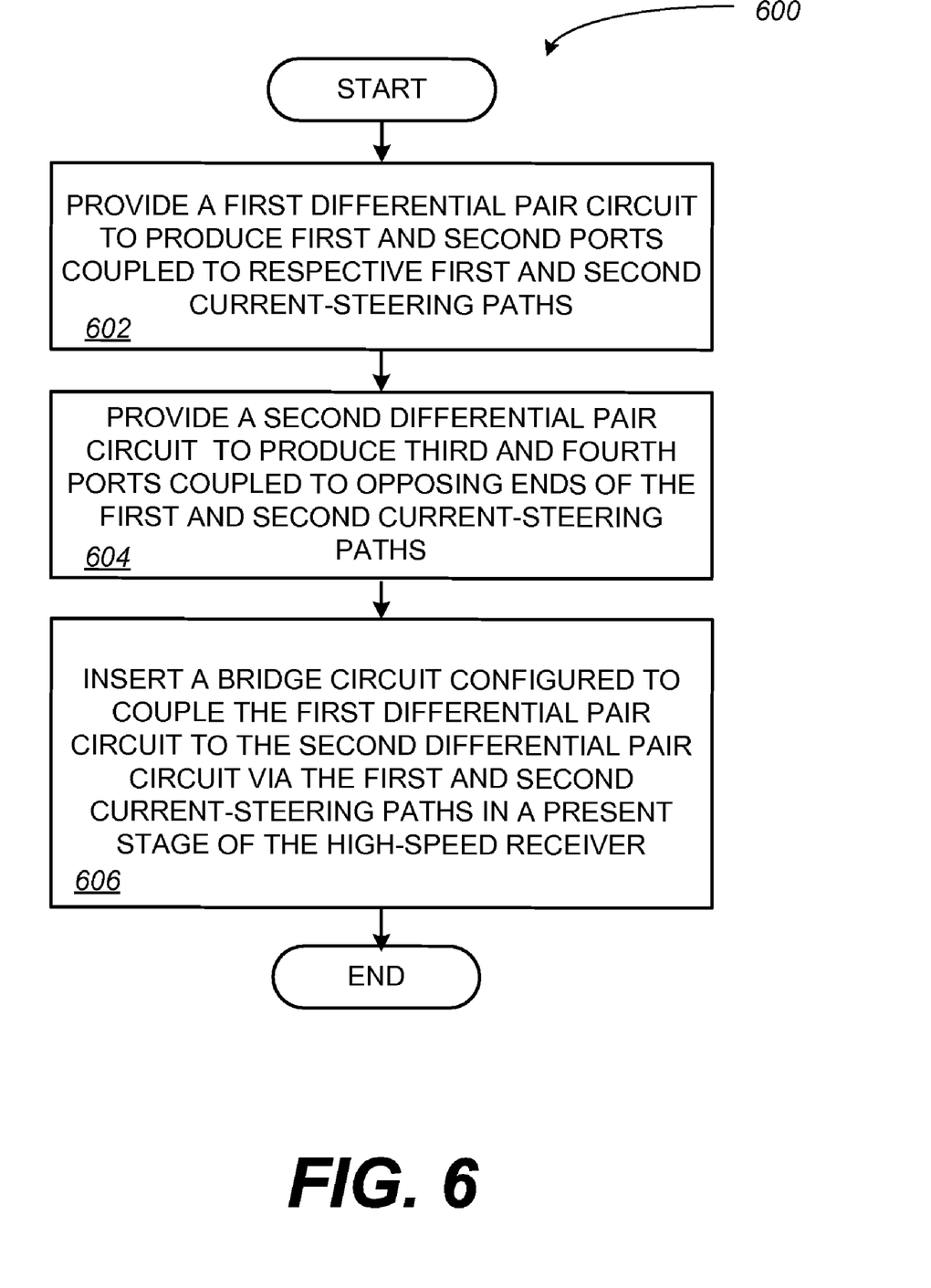
FIG. 6 is a flow chart illustrating an embodiment of a method for implementing a high-speed receiver.

FIG. 6 is a flow chart illustrating an embodiment of a method 600 for implementing a high-speed receiver. Method 600 begins with block 602 where a first differential pair circuit is provided to produce first and second ports that are coupled to respective first and second current-steering paths. In block 604, a second differential pair circuit is provided to produce third and fourth ports that are coupled to opposing ends of the first and second current-steering paths. Thereafter, as indicated in block 606, a bridge circuit is inserted between the first differential pair circuit and the second differential pair circuit to couple the differential pair circuits via the first and second current-steering paths in a present stage of the high-speed receiver.

Figure 7:
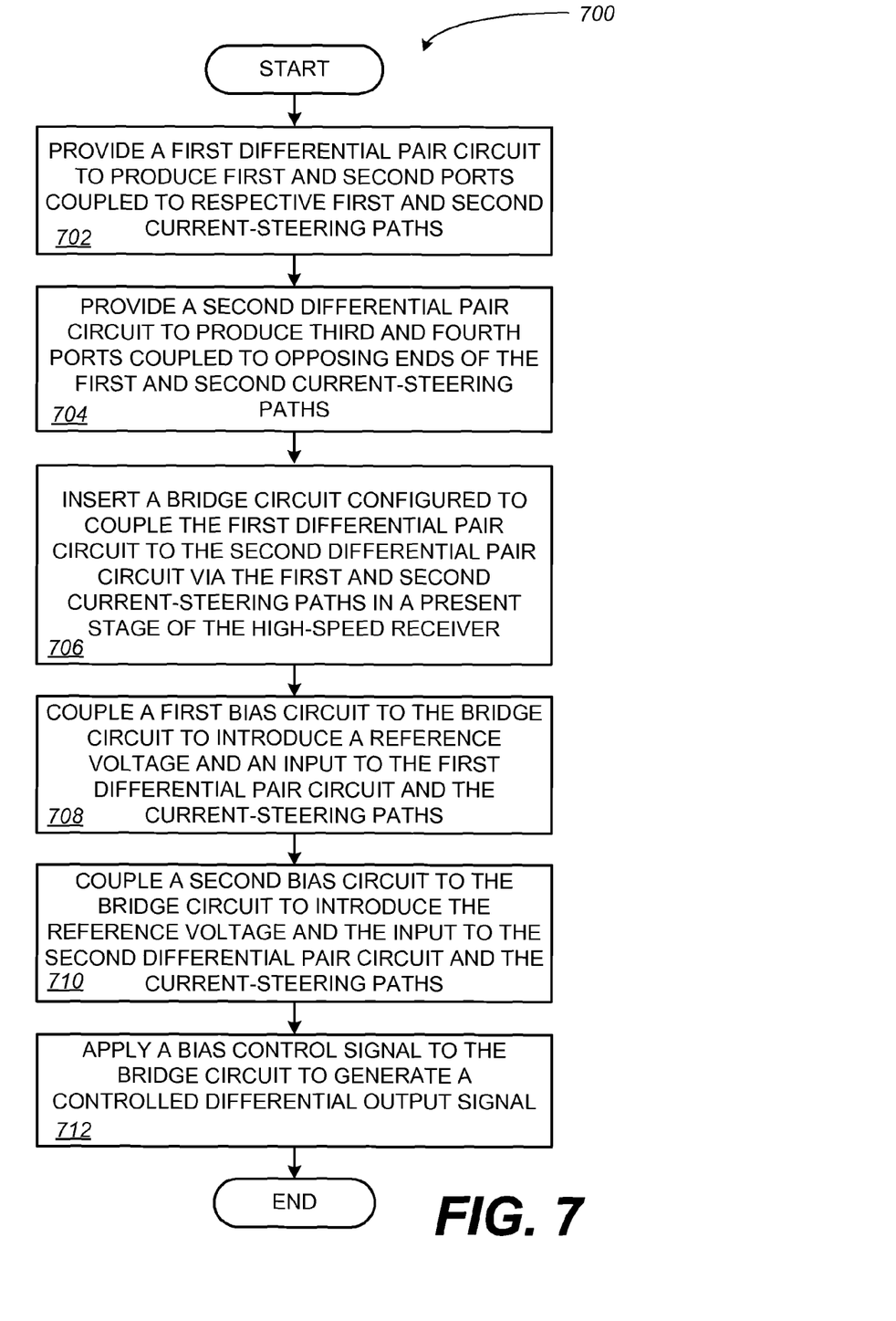
FIG. 7 is a flow chart illustrating an alternative embodiment of a method for implementing a high-speed receiver.

FIG. 7 is a flow chart illustrating an alternative embodiment of a method 700 for implementing a high-speed receiver. Method 700 begins with block 702 where a first differential pair circuit is provided to produce first and second ports that are coupled to respective first and second current-steering paths. In block 704, a second differential pair circuit is provided to produce third and fourth ports that are coupled to opposing ends of the first and second current-steering paths. Thereafter, as indicated in block 706, a bridge circuit is inserted between the first differential pair circuit and the second differential pair circuit to couple the differential pair circuits via the first and second current-steering paths in a present stage of the high-speed receiver. As indicated in block 708, a first bias circuit is coupled to the bridge circuit to introduce a reference voltage and an input to the first differential pair circuit and the current-steering paths. In block 710, a second bias circuit is coupled to the bridge circuit to introduce the reference voltage and the input to the second differential pair circuit and the current-steering paths. Thereafter, in block 712, a bias control signal is applied to the bridge circuit to generate a controlled differential output signal.

Figure 8:
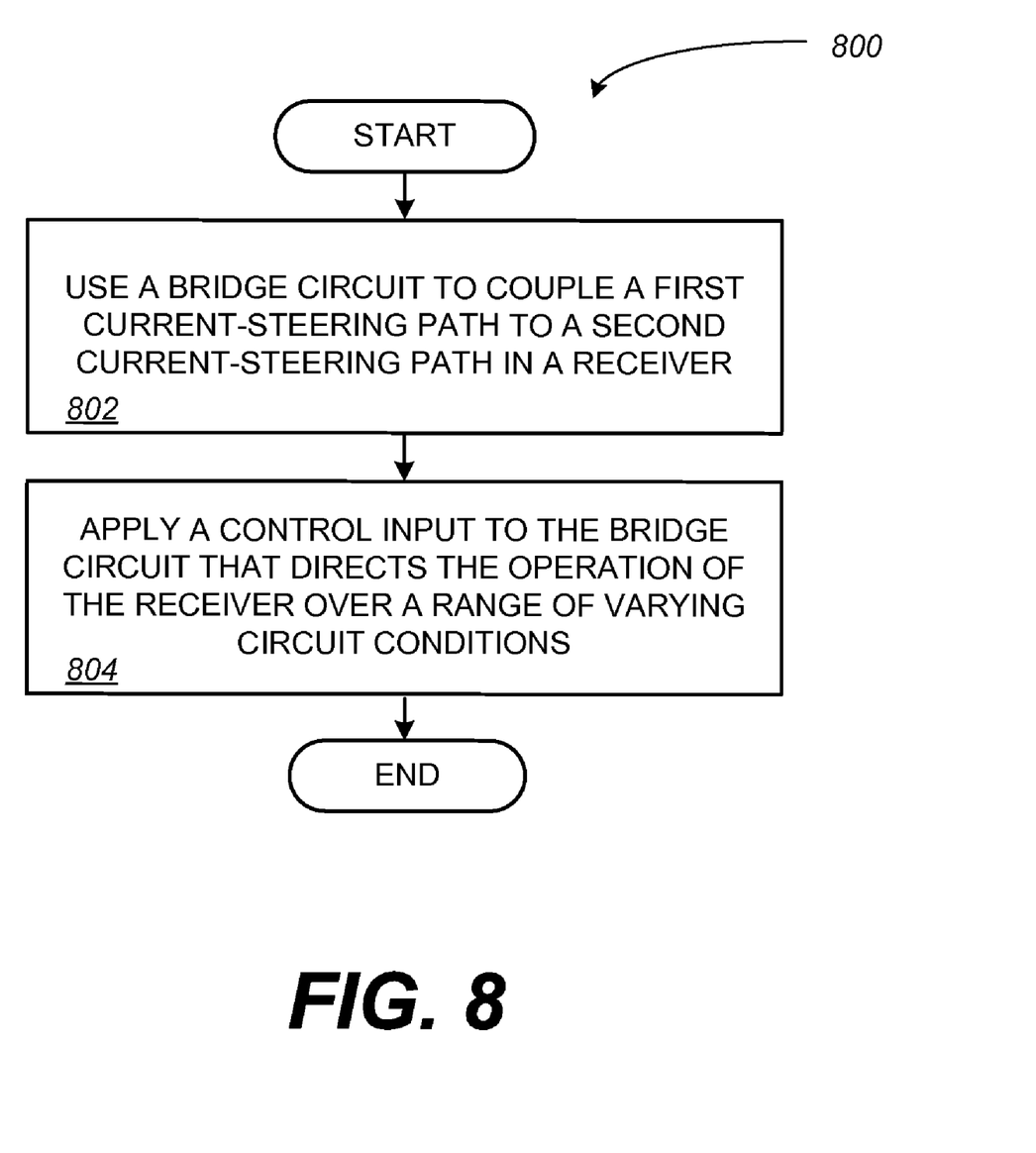
FIG. 8 is a flow chart illustrating an embodiment of a method for controlling a receiver that includes dual current-steering paths.

FIG. 8 is a flow chart illustrating an embodiment of a method 800 for controlling a receiver. Method 800 begins with block 802 where a bridge circuit is used to couple a first current-steering path to a second current-steering path in a receiver. In block 804, a control input is applied to the bridge circuit. The control input enables the receiver to operate over a range of varying circuit conditions.

Figure 9:
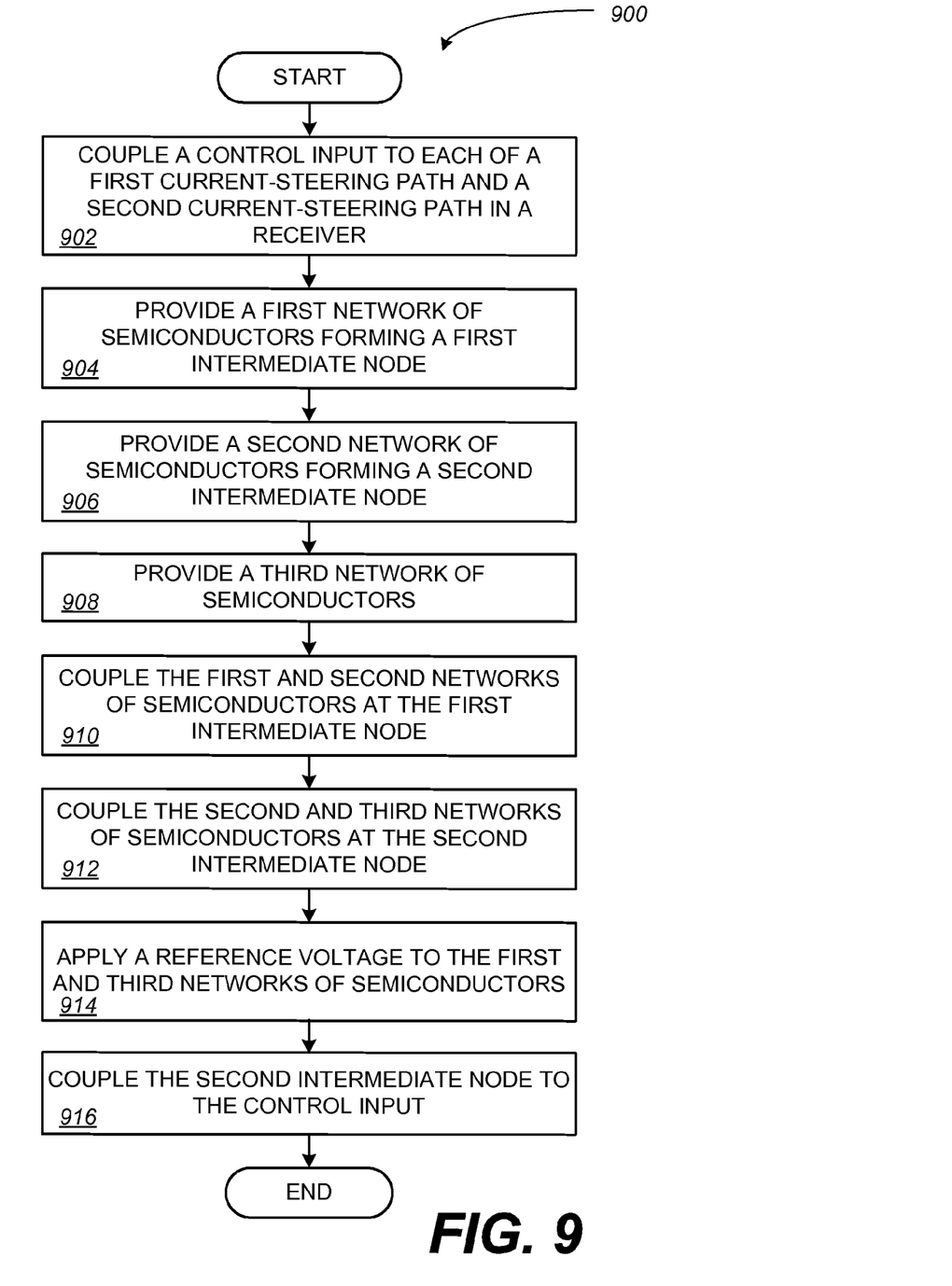
FIG. 9 is a flow chart illustrating an alternative embodiment of a method for controlling a receiver that uses dual current-steering paths.

FIG. 9 is a flow chart illustrating an alternative embodiment of a method 900 for controlling a receiver that uses dual current-steering paths. Method 900 begins with block 902 where a control input is coupled to each of a first and a second current-steering path of a receiver. In block 904, a first network of semiconductors is provided. The first network of semiconductors forms a first intermediate node. In block 906, a second network of semiconductors is provided. The second network of semiconductors forms a second intermediate node. In block 908, a third network of semiconductors is provided. In block 910, the first and second networks of semiconductors are connected at the first intermediate node. In block 912, the second and third networks of semiconductors are connected at the second intermediate node. In block 914, a reference voltage is applied to the first and third networks of semiconductors. In block 916, the second intermediate node is coupled to the control input.

While various embodiments of the bias circuit for a high-speed receiver assembly and methods for controlling a high-speed receiver that includes a dual current-steering path architecture have been described, it will be apparent to those of ordinary skill in the art that many more embodiments and implementations are possible that are within the scope of this disclosure. Accordingly, the high-speed receiver assembly and bias control circuit are not to be restricted or otherwise limited except in light of the attached claims and their equivalents.

What is claimed is:

1. A method for controlling a receiver that uses a dual current-steering architecture, the method comprising:
   coupling a control input to each of a first and a second current-steering path in a receiver;
   providing a first network of semiconductor devices forming a first intermediate node;
   providing a second network of semiconductor devices forming a second intermediate node;
   providing a third network of semiconductor devices;
   coupling the second network of semiconductor devices to the first network of semiconductor devices at the first intermediate node;
   coupling the third network of semiconductor devices to the second network of semiconductor devices at the second intermediate node;
   applying a reference voltage to the first and third networks of semiconductor devices; and
   coupling the second intermediate node to the control input.

2. The method of claim 1, wherein coupling a control input comprises coupling first and second positive channel field-effect transistors (PFETs).

3. The method of claim 1, wherein providing a first network of semiconductor devices further comprises receiving a first signal from a first bias circuit of the receiver.

4. The method of claim 1, wherein providing a first network of semiconductor devices comprises arranging a pair of positive channel field-effect transistors (PFETs) and a pair of negative channel filed-effect transistors (NFETs).

5. The method of claim 1, wherein providing a second network of semiconductor devices comprises arranging a positive channel field-effect transistor (PFET) and a negative channel field-effect transistor (NFET).

6. The method of claim 1, wherein providing a third network of semiconductor devices comprises receiving a second signal from a second bias circuit of the high-speed receiver.

7. A method for controlling a receiver that uses a dual current-steering architecture, the method comprising:
   using a bridge circuit to couple a first and a second current-steering path in a receiver; and
   applying a control input to the bridge circuit that directs operation of the receiver over a range of varying circuit conditions, by adjusting a voltage such that the receiver can use field-effect transistors (FETs) that reliably operate at a higher voltage to operate the receiver at a lower voltage over a set of worst case conditions.

8. The method of claim 7, wherein adjusting the voltage comprises using FETs that reliably operate at approximately 3.3V to operate the receiver at approximately 1.5V.

9. A circuit for controlling a receiver assembly, comprising:
   a first semiconductor device network having a first intermediate node;
   a second semiconductor device network having a second intermediate node, the second semiconductor device network coupled to the first semiconductor network via the first intermediate node; and
   a third semiconductor device network coupled to the second semiconductor device network via the second intermediate node, wherein the second intermediate node is further coupled to a bridge circuit in the receiver assembly, the bridge circuit comprising first and second current-steering paths.

10. The circuit of claim 9, wherein the first semiconductor network is responsive to a first signal from a first bias circuit.

11. The circuit of claim 9, wherein the third semiconductor network is responsive to a second signal from a second bias circuit.

12. The circuit of claim 9, wherein the first and third semiconductor networks are responsive to a reference voltage.

13. The circuit of claim 9, wherein the first semiconductor device network comprises a first set of positive channel field-effect transistors (PFETs).

14. The circuit of claim 9, wherein the first semiconductor device network comprises a second set of negative channel field-effect transistors (NFETs).

15. The circuit of claim 9, wherein the second semiconductor device network comprises a positive channel field-effect transistor (PFET) and a negative channel field-effect transistor (NFET).

16. The circuit of claim 9, wherein the third semiconductor device network comprises a third set of positive channel field-effect transistors (PFETs).

17. The circuit of claim 9, wherein the voltage on the second intermediate node directs the bridge circuit over a range of temperatures.

18. The circuit of claim 9, wherein the voltage on the second intermediate node directs the bridge circuit over a range of conditions that result from semiconductor device manufacturing process variation.

19. The circuit of claim 9, wherein the voltage on the second intermediate node directs the bridge circuit over a range of conditions that result from input voltage variation.

20. The circuit of claim 9, wherein the voltage on the second intermediate node directs the bridge circuit such that the receiver assembly is operational over a set of simulated corner cases.

* * * * *